Oct. 31, 1961     C. E. HILGERS     3,006,292
PIE BAKING APPARATUS

Filed Dec. 23, 1960     2 Sheets—Sheet 1

INVENTOR
CLAIR E HILGERS
BY
Kimmel & Crowell
ATTORNEYS

United States Patent Office 3,006,292
Patented Oct. 31, 1961

3,006,292
PIE BAKING APPARATUS
Clair E. Hilgers, 6132 Saratoga Circle, Dallas, Tex.
Filed Dec. 23, 1960, Ser. No. 78,068
3 Claims. (Cl. 107—60)

This invention relates to a pie baking apparatus and has as its primary object the provision of a device wherein a relatively large number of pies may be baked simultaneously to provide evenly cooked pies of uniform consistency and flavor.

An additional object of the invention is the provision of such a device wherein a large number of batches of pies may be baked successively in such manner as to ensure even baking and even quality of the resultant product.

An additional object of the invention is the provision of such a device which cooks by direct heat, embodying both an upper and lower heating element providing even heat on both the top and bottom of the pies, thus uniform cooking.

An additional important object of the invention is the provision of a rotatable flat aluminum tray supporting the pies during baking in spaced relation to the heating elements so that the top, bottom, and filling in the pie are all cooked together, thus preventing the filling in the pie from boiling and thereby cracking the top crust and spilling over the heating element.

A more specific object of the invention is the provision of means for rotating the trays uniformly over an arcuate heating element, and beneath a corresponding element, the heating element being so constituted as to have a hot arcuate center section, and cold end portions, whereby in the event that the filling should spill over onto the heating elements there is no possibility of the filling engaging a hot portion thereof resulting in a blaze in the apparatus.

An additional object of the invention is the provision of such a pie baking apparatus which will thoroughly cook the pies contained therein at a relatively low direct heat, in contrast with the relatively high radiant heat of hitherto known devices.

A further important object of the invention is the provision of means for removably mounting the aluminum trays on a rotatable spindle, together with means for adjusting the relative spacing of the trays between pairs of upper and lower heating elements in accordance with different conditions, as for example, for different fillings of pies, wherein it is desired to position the top of the pie closer to or farther away from the upper heating element.

A further object of the invention is the provision of aluminum trays which may be readily removed from the spindle with a minimum of effort and difficulty, so that the trays may be filled outside of the cabinet comprising an element of the apparatus, and removed from the tray with a minimum of effort and difficulty.

Still another object of the invention is the provision of an apparatus of this sort which is sturdy and durable in construction, reliable and efficient in operation, and relatively simple and inexpensive to manufacture and operate.

Still other objects reside in the combinations of elements, arrangements of parts, and features of construction, all as will be more fully pointed out hereinafter and disclosed in the accompanying drawings wherein:

FIGURE 3 is an enlarged horizontal sectional view taken substantially along the line 3—3 of FIG. 1 as viewed in the direction indicated by the arrows;

FIGURE 4 is a fragmentary enlarged sectional view taken substantially along the line 4—4 of FIG. 3 as viewed in the direction indicated by the arrows;

Similar reference characters refer to similar parts throughout the several views of the drawing.

Figure 1:
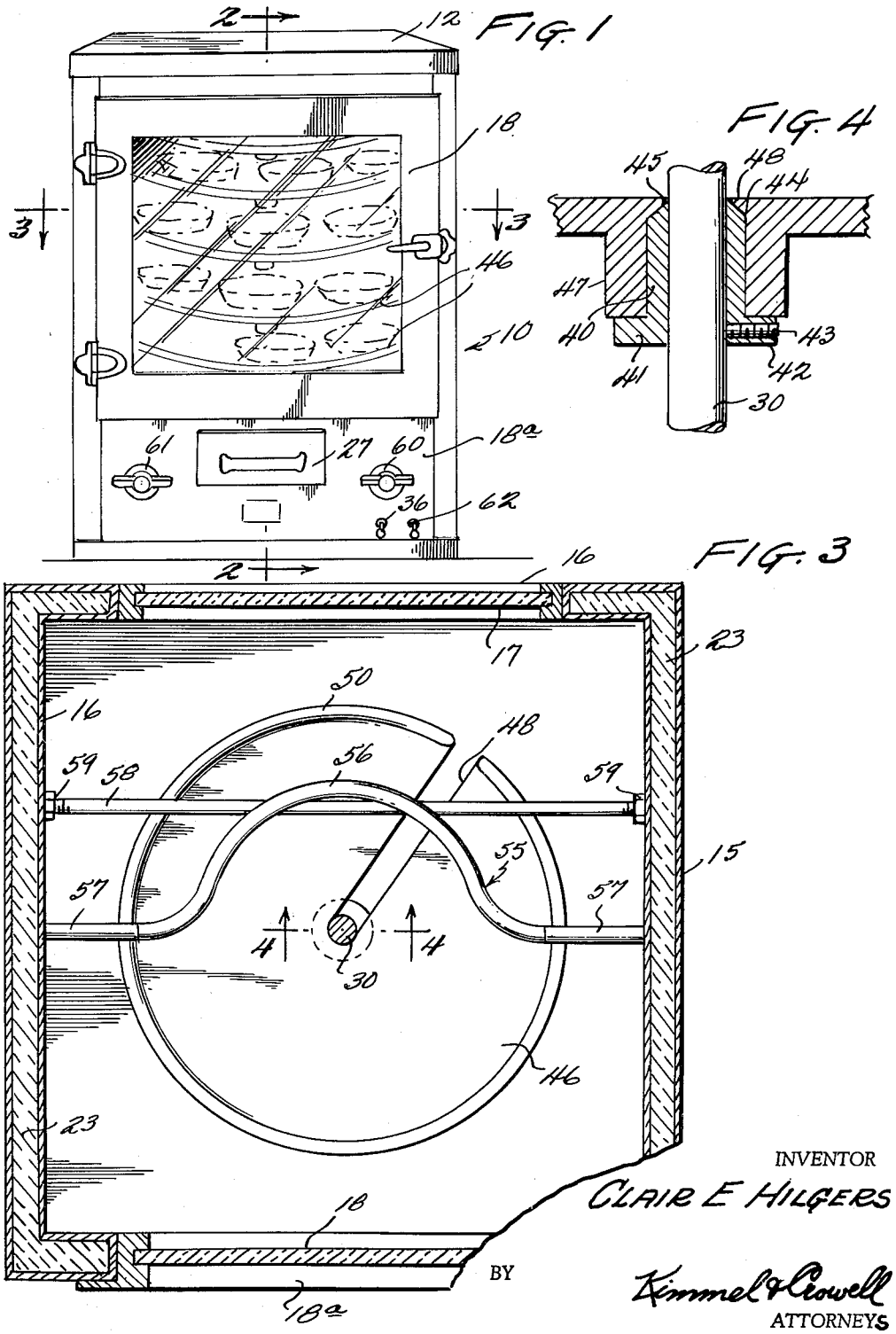
FIGURE 1 is a front perspective view of one form of pie baking apparatus constructed in accordance with the instant invention.

Having reference now to the drawings in detail, there is generally indicated at 10 a cabinet structure, basically of the type disclosed in my prior patent entitled "Combination Cooker and Warmer," dated August 4, 1959, No. 2,897,746. The cabinet structure comprises a top 12, a bottom 13, a pair of side walls 14 and 15, and a back side wall formed of a bottom panel 16 and a window 17. The front of the cabinet includes a panel 18a in a glassed door 18.

The interior of the cabinet is separated into an upper baking compartment 20 and a lower engine compartment 21 divided by a horizontal partition 22 disposed between the bottom panels 16 and 18a.

The side walls and the horizontal partition 22 are double walled and provided with an internal filling of insulating material whereby the baking apparatus is insulated against heat loss.

A drain pan 24 is disposed in oven compartment 20 and rests upon the horizontal partition 22. The pan 24 is provided with a drain pipe 25 which extends downwardly through partition 22 into the motor compartment 21 to empty any drippings into a drip pan 26. The front end of pan 26 is provided with a door 27 located externally of the bottom front panel 18, and is supported slidably on a plate 28 so as to be readily removable.

A vertical shaft 30 extends from a top bearing 31 on the underside of top wall 12 through a bearing 32 and partition 22, and extends into a reduction gearing box 33, the gearing in box 33 being rotated by a suitable shaft extending from an electric or other motor 35 contained in compartment 21. The arrangement is such that the shaft is continuously rotated by the motor when desired, control being effected in any desired conventional manner by means of a switch 36.

Shaft 30 carries a plurality of collar elements 40, illustratively five, each of which is comprised of an annular ring 41, having a threaded opening 42 therein through which extends a set screw 43 whereby the collars may be moved vertically on a shaft 30, and secured in desired position. Integral with each portion 40 is a vertical flange member 44, which is beveled or tapered at its upper extremity as at 45. An aluminum tray generally indicated at 46, which is of imperforate construction, is positioned to fit on each supporting collar 40. Each tray includes a depending flange 47, having an upper tapered opening 48 so as to fit snugly over the flange 44 and its tapered upper portion 45 and be supported thereby. A radial slot 48 is also provided in each tray in order to facilitate the positioning of the trays on the collars, and interiorly of the cabinet 10, the arrangement being such that each tray may be slid horizontally out of engagement with the shaft 30 and its associated collar 40 and into a position interiorly or exteriorly of the receptacle 10 as desired. An annular bead or rim 50 surrounds each tray 46 to retain any drippings from the filling of the pie on the tray, from which such drippings may be readily cleaned. It will be noted that should any filling overflow the rim 50 will fall into the drip pan 24, and may thence drain through the opening 25 into the drawer of pan 26.

A plurality of heating elements, generally indicated at 55, extend transversely between the side walls 15 and 16, and are suitably supplied with current by conventional wiring not shown. Each heating element 55 comprises an arcuate portion 56 so dimensioned as to be co-axial with each tray 46, and dimensioned to underlie or overlie the mid portion of the tray, so that heat is disseminated equally toward the rim 50 and the center of the tray. The central portion 56 is heated, while the opposite ends of the heating element are cold, the construction of the interior of the element being known, the cold ends being provided so that any filling overflowing the rims 50 will not strike directly against the heated portion of the heating element, and hence the possibility of starting a blaze interiorly of the device is obviated. Transverse supporting rods 58 fixedly secured as by nuts 59 extend beneath the outermost portion of each heating element, and serve as a support therefor when the device becomes hot, in order to prevent disalignment occasioned through softening and heat distortion of the element.

Figure 2:
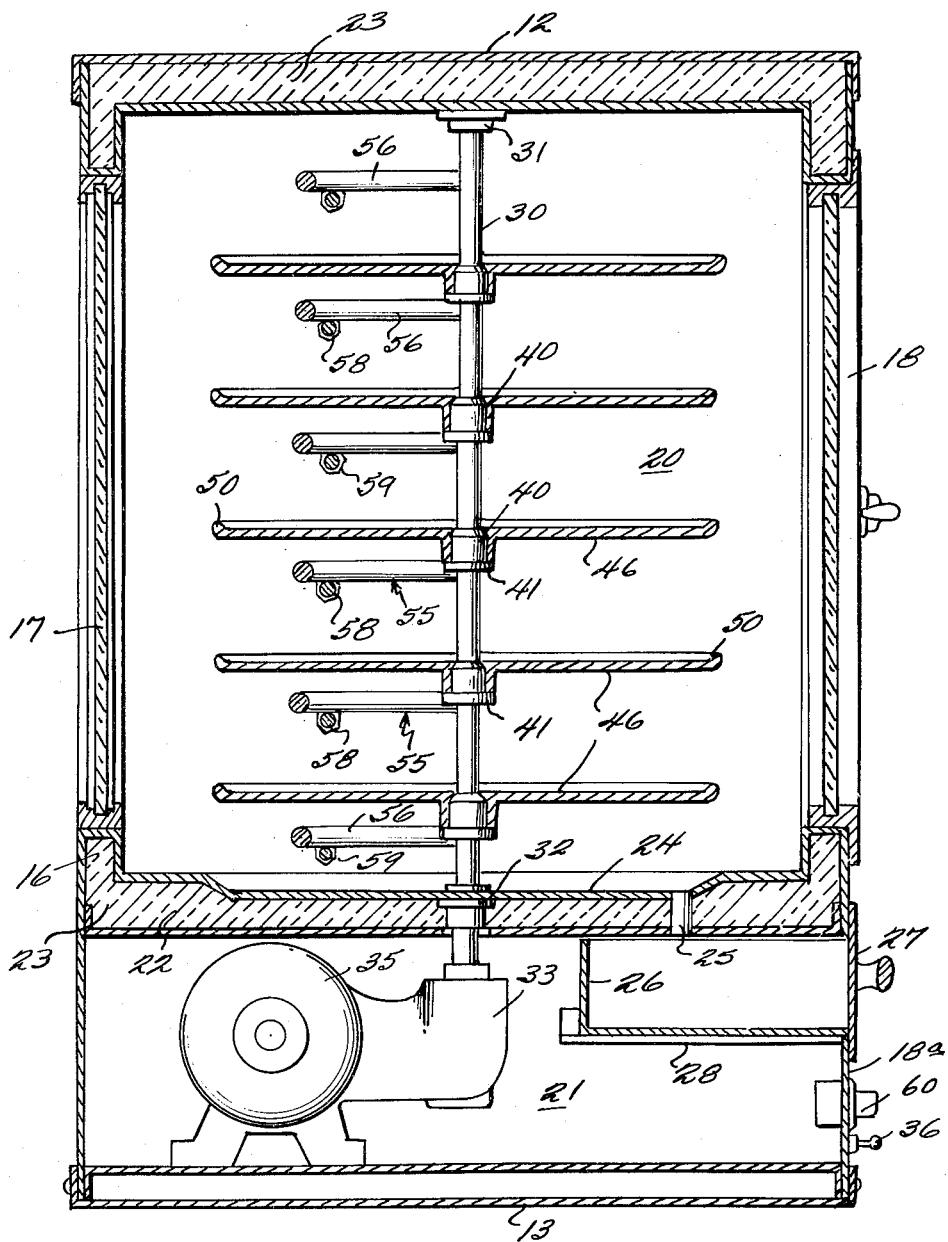
FIGURE 2 is an enlarged vertical sectional view taken substantially along the line 2—2 of FIG. 1 as viewed in the direction indicated by the arrows.

As best shown in FIG. 2, the arrangement is such that for the five trays, as illustratively shown in the instant embodiment, there are provided six heating elements, so that each tray is provided with an upper element and a lower element, the lowermost element being positioned beneath the lowermost tray 46, and the uppermost heating element 56 being positioned above the uppermost tray, with the intermediate elements serving to heat both the trays above and the trays below.

In the use and operation of the device, pies are preformed and placed in suitable pans, the pans in turn being positioned on each shelf 46, as indicated in dotted lines in FIG. 1. A thermostatic switch 60 is set at a desired temperature to control the interior heating of the device, which has been found by experimentation to be in the neighborhood of 370° F. as contrasted to the conventional 400° F. or higher used in apparatus of this sort embodying radiant heat. A suitable timing element 61 is also set to ensure the proper timing for the baking, in accordance with the constituents and composition of the pies. The motor 35 is energized by means of switch 36, and the entire assembly put into operation by means of the on and off switch 62. The wiring is conventional, and the electrical circuitry comprises no part of the instant invention.

Obviously, by virtue of the aluminum trays which have high heat retentive qualities, direct heat is imparted to the pies on each tray or shelf from both the underside and the top, thus ensuring an even and equal continuous baking by direct heat. Equally obviously, any desired number of pies may be baked within the size and capacity of the apparatus, and by maintaining the same temperature settings and speed of rotation, as well as the same time, uniform batches of pies may be baked in relatively large quantities.

From the foregoing it will now be seen that there is herein provided an improved pie baking apparatus which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

1. Pie baking apparatus comprising an insulated casing, a vertical shaft in said casing, motor means for rotating said shaft, a plurality of vertically adjustable collars on said shaft, a flat imperforate circular aluminum tray mounted on each collar, heating elements extending transversely across said casing above and below each tray, each heating element being comprised of a pair of opposite straight cold end sections and a central arcuate hot section, said arcuate section being co-axial with said circular trays and spaced substantially midway between the center and the rim of the trays, and a transverse supporting rod having its ends journalled in said casing positioned beneath each arcuate section.

2. Pie baking apparatus comprising an insulated casing, a vertical shaft in said casing, motor means for rotating said shaft, a plurality of vertically adjustable collars on said shaft, a flat imperforate circular aluminum tray mounted on each collar, heating elements extending transversely across said casing above and below each tray, each heating element being comprised of a pair of opposite straight cold end sections and a central arcuate hot section, said arcuate section being co-axial with said circular trays and spaced substantally midway between the center and the rim of the trays, a transverse supporting rod having its ends journalled in said casing positioned beneath each arcuate section, said trays each having a bushing surrounding a collar, and a radial slot extending from the rim of the tray through said bushing to facilitate removal and positioning of the trays on said shaft.

3. Pie baking apparatus as defined in claim 2 wherein said insulated casing includes a bottom wall having portions defining a drain pan into which drippings from baking pies may drop, and means communicating said drain pan with a removable receptacle in which said drippings are collected.

References Cited in the file of this patent

UNITED STATES PATENTS

| 1,384,406 | Reid | July 12, 1921 |
| 1,543,692 | Biebel | June 30, 1925 |
| 2,969,452 | Geller et al. | Jan. 24, 1961 |

FOREIGN PATENTS

| 2,713 | Great Britain | Nov. 17, 1856 |